US008817986B2

(12) United States Patent
Chatt et al.

(10) Patent No.: US 8,817,986 B2
(45) Date of Patent: Aug. 26, 2014

(54) CROSS ENTERPRISE COMMUNICATION

(75) Inventors: Alan James Chatt, Salisbury (GB); Christopher Colin Paice, Chandler's Ford (GB); Cyril Peter Stewart, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/407,974

(22) Filed: Feb. 29, 2012

(65) Prior Publication Data
US 2012/0224690 A1 Sep. 6, 2012

(51) Int. Cl.
*H04L 29/06* (2006.01)
*H04L 9/32* (2006.01)

(52) U.S. Cl.
CPC .......... *H04L 63/0442* (2013.01); *H04L 63/045* (2013.01); *H04L 63/0464* (2013.01); *H04L 63/0823* (2013.01); *H04L 63/123* (2013.01); *H04L 9/3268* (2013.01); *H04L 9/3247* (2013.01)
USPC ........... 380/255; 380/260; 380/279; 380/283; 726/4; 726/7; 713/156; 713/169; 713/176; 713/182; 713/189

(58) Field of Classification Search
CPC .............. H04L 63/045; H04L 63/0442; H04L 63/0464; H04L 63/0823; H04L 63/123; H04L 9/3268; H04L 9/3247
USPC ........ 726/5, 26; 713/156, 168, 169, 176, 179, 713/180, 182, 193; 380/201, 255–257, 260, 380/265, 279–282
See application file for complete search history.

(56) References Cited

U.S. PATENT DOCUMENTS 6,687,822 B1  2/2004 Jakobsson
7,478,172 B1 * 1/2009 Lee et al. ...................... 709/249
(Continued)

FOREIGN PATENT DOCUMENTS

CN           1681238 A     10/2005

OTHER PUBLICATIONS

International Business Machines Corporation, et al., International Application No. PCT/IB2012/050925 filed Feb. 28, 2012; International Search Report and Written Opinion dated Jul. 12, 2012.

(Continued)

*Primary Examiner* — Hadi Armouche
*Assistant Examiner* — Hee Song
(74) *Attorney, Agent, or Firm* — Yudell Isidore Ng Russell PLLC

(57) ABSTRACT

A system enables intermediary communication components to carry out cross enterprise communication. At a first sending enterprise the system comprises: a processor executing code to: receive a signed encrypted message from a sender within a first enterprise; validate the sender; decrypt the message; encrypt the message for receipt by a second enterprise; sign the encrypted message by the first enterprise; and send the re-signed re-encrypted message to a second enterprise. At the second receiving enterprise, the system comprises a processor executing code to: receive a signed encrypted message from a first enterprise; validate that the first enterprise is the sender; decrypt the message; encrypt the message for receipt by recipients at the second enterprise; sign the encrypted message by the second enterprise indicating that the message is from the first enterprise; and send the re-signed re-encrypted message to the recipients of the second enterprise.

11 Claims, 7 Drawing Sheets

(56) References Cited

U.S. PATENT DOCUMENTS

| | | |
|---|---|---|
| 7,739,501 B2 | 6/2010 | Kimmel |
| 2002/0029337 A1 | 3/2002 | Sudia et al. |
| 2003/0028768 A1* | 2/2003 | Leon et al. .................... 713/169 |
| 2003/0172262 A1* | 9/2003 | Curry ........................... 713/156 |
| 2004/0003247 A1 | 1/2004 | Fraser et al. |
| 2005/0257045 A1 | 11/2005 | Bushman et al. |
| 2006/0112265 A1 | 5/2006 | Huynh et al. |
| 2007/0101159 A1 | 5/2007 | Zhang et al. |
| 2007/0143408 A1* | 6/2007 | Daigle ......................... 709/206 |
| 2007/0274520 A1 | 11/2007 | Ogata |
| 2009/0086977 A1 | 4/2009 | Berggren |
| 2009/0222668 A1 | 9/2009 | Zaccone et al. |

OTHER PUBLICATIONS

Kwok-Yan Lam, Siu-Leung Chung, Ming Gu, and Jia-Guang Sun; "Security Middleware for Enhancing Interoperability of Public Key Infrastructure" (Abstract), Computers & Security, vol. 22, Issue 6, Sep. 2003, pp. 535-546. http://www.sciencedirect.com/science/article/pii/S0167404803006151.

Germany Patent Office, DE Application No. 112012000358.6; Office action dated Aug. 20, 2013 (7 pg.).

* cited by examiner

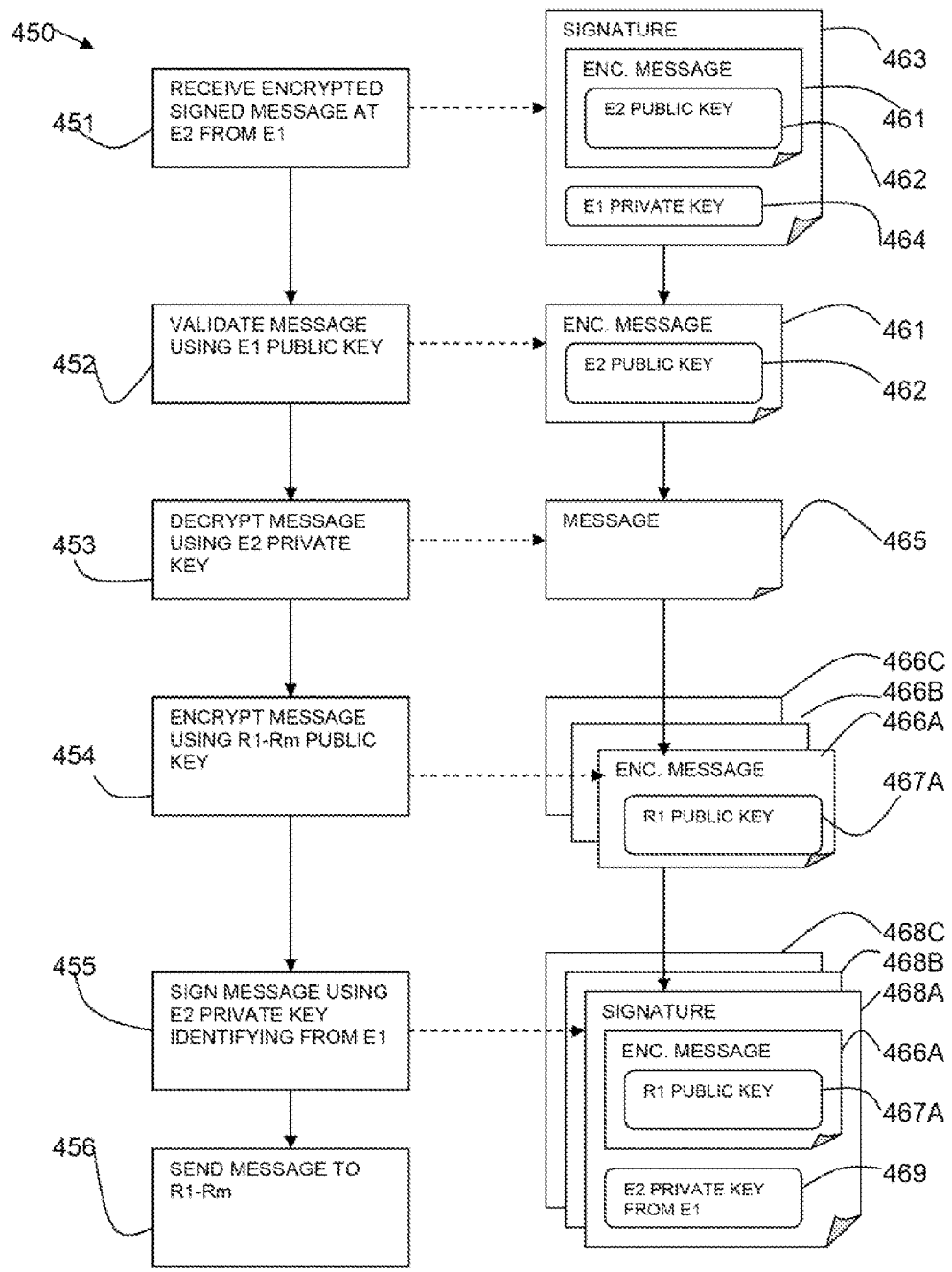

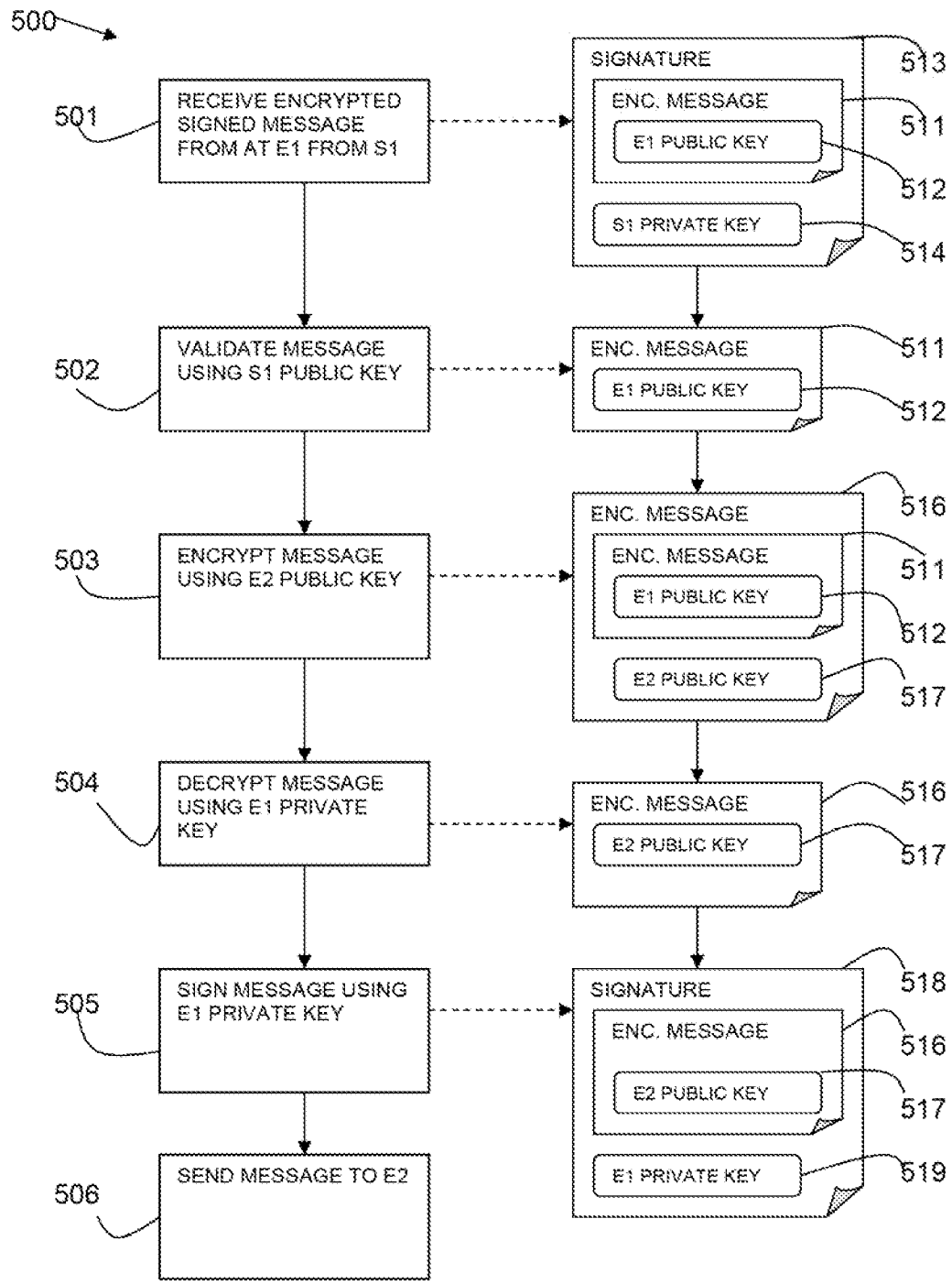

CROSS ENTERPRISE COMMUNICATION

PRIORITY CLAIM

The present application claims benefit of priority under 35 USC §120 and §365 to the previously filed Great Britain Patent Application No. 11156518.0 titled, "Cross Enterprise Communication" with a priority date of Mar. 2, 2011. The content of that application is incorporated by reference herein.

BACKGROUND

1. Field of Invention

This invention relates to the field of cross enterprise communication. In particular, the invention relates to cross enterprise communication using digital certificates.

2. Background of the Invention

When sending encrypted data using the public-key cryptography standard (PKCS) software, the recipients' Distinguished Names (DN) are specified. When receiving encrypted information, the sender's DN can be checked to make sure it is in the expected list of senders. The lists of recipients and senders in an enterprise are maintained and these lists may be lengthy and require constant updating as people join or leave an enterprise.

An example is considered of an enterprise E1 which has a department of three people (E1S1, E1S2, E1S3) who send encrypted messages to another enterprise E2. Within enterprise E2 there are three people (E2R1, E2R2, E2R3) who are authorized to receive and decrypt the messages.

A message from a sender (E1S1, E1S2, or E1S3) of E1 would be encrypted using the public key for the intended recipients E2R1, E2R2, E2R3 at enterprise E2, and signed with the private key of the sender (E1S1, E1S2, or E1S3). This is then sent to enterprise E2.

Any of the three people E2R1, E2R2, E2R3 at enterprise E2 can decrypt the message because the encrypted key has been encrypted for them. Other users cannot decrypt the message without access to the private keys of the three users.

At enterprise E2, there is a list of authorized senders, which in this case is E1P1, E2P2, E2P3, and there might be E3S1, E4S1, etc. as well from other enterprises, from which the signature of the received message is checked.

If someone joins an enterprise and is authorized to send encrypted data, it is necessary to inform all of the potential recipients in that enterprise and other enterprises that there is a new name to be added to the list of authorized senders.

Similarly, if someone joins an enterprise and is allowed to receive encrypted data, then the recipient's name needs to be added to the authorized recipients list in each enterprise who sends encrypted messages.

If someone leaves, the name of the person who has left needs to be removed from the authorized sender and recipient lists in all enterprises.

This work to maintain lists is complex and error prone. For example, one enterprise may be slow in updating definitions, and so errors arise in sending data because people are not authorized.

Therefore, there is a need in the art to address the aforementioned problem.

SUMMARY

According to a first aspect of the present disclosure there is provided a system for cross enterprise communication at a first sending enterprise, the system comprising: a processor executing code that causes the system to: receive a signed previously-encrypted message from a sender within a first enterprise; validate the sender; decrypt the message; encrypt the message for receipt by a second enterprise; sign the encrypted message by the first enterprise; and send the encrypted message signed by the first enterprise to the second enterprise.

According to a second aspect of the present disclosure there is provided a system for cross enterprise communication at a second receiving enterprise, the system comprising: a processor executing code that causes the system to: receive a signed encrypted message from a first enterprise; validate that the first enterprise is the sender; decrypt the message; encrypt the message for receipt by one or more recipients at the second enterprise; sign the encrypted message by the second enterprise indicating that the encrypted message is from the first enterprise; and send the encrypted message signed by the second enterprise to the one or more recipients.

According to a fourth aspect of the present disclosure there is provided a computer program product comprising computer program code stored on a computer readable medium/device, wherein the program code comprises code portions that when executed on a computer performs the method functions of the above first aspect of the present disclosure.

According to a fifth aspect of the present disclosure there is provided a computer program product comprising computer program code stored on a computer readable medium/device, wherein the program code comprises code portions that when executed on a computer performs the method functions of the above second aspect of the present disclosure.

BRIEF DESCRIPTION OF THE DRAWINGS

The subject matter of the embodiments disclosed herein is particularly pointed out and distinctly claimed in the concluding portion of the specification. The disclosure, both as to organization and method of operation, together with objects, features, and advantages thereof, may best be understood by reference to the following detailed description when read with the accompanying drawings in which:

FIG. 4B is a flow diagram of a method of receiving a message in accordance with a first embodiment of the present disclosure;

FIG. 5A is a flow diagram of a method of sending a message in accordance with a second embodiment of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the disclosure. However, it will be understood by those skilled in the art that the embodiments of the present disclosure can be practiced without these specific details. In other instances, well-known methods, procedures, and components have not been described in detail so as not to obscure described aspects of the present disclosure.

Within the disclosure, the term enterprise is used for any organisation that has multiple sender and receivers within it. The senders and receivers may be individuals or groups within an enterprise. The senders and receiver may each have a distinguished name.

On the edges of an enterprise, where data is sent to another enterprise, a component is provided which removes the individual sender name and replaces the sender's name with an enterprise name by decrypting and re-encrypting the data.

In the described system, an authorized list of senders for an enterprise may have just one enterprise distinguished name. Similarly, at the enterprise on the receiving end, a list of authorized recipients may be built. This building of the list of authorized recipients is done within the scope of the enterprise and is therefore easy to manage.

Once the enterprise names are established, it is not necessary to inform other enterprises if the internal users change within an enterprise.

Figure 1:
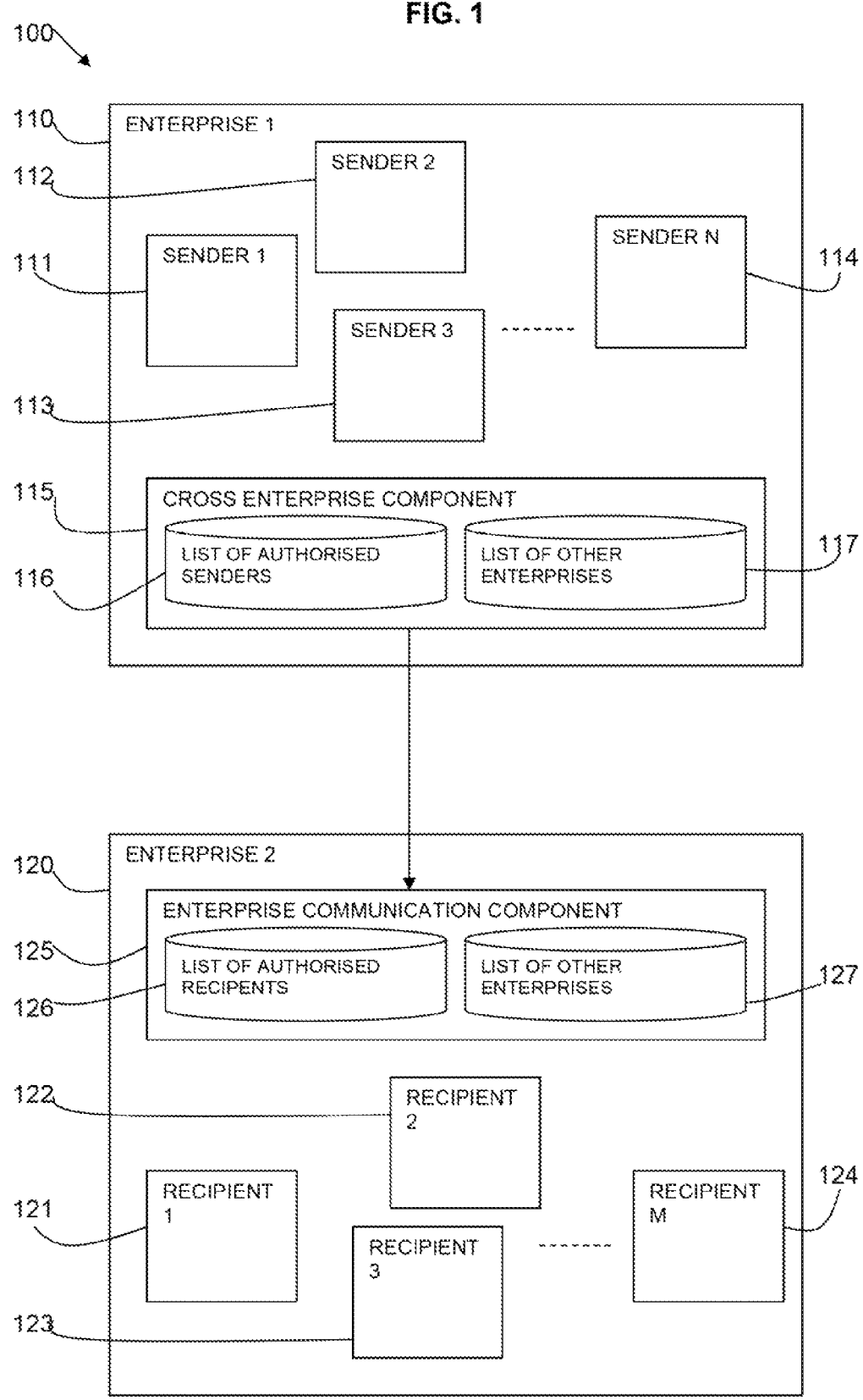
FIG. 1 is a block diagram of an enterprise communication system in accordance with the present disclosure.

Referring to FIG. 1, a block diagram 100 shows communication between two enterprises. A first enterprise 110 has multiple senders 111-114 who may wish to send an encrypted message to recipients 121-124 in a second enterprise 120.

In the described system, a first enterprise communication component 115 is provided at the first enterprise 110 and handles the communication with other enterprises such as the second enterprise 120. The first enterprise communication component 115 includes data storage of a list 116 of authorized senders 111-114 from within the first enterprise 110. The data storage may also include a list 117 of other enterprises (such as the second enterprise 120) with which the first enterprise 110 communicates.

A second enterprise communication component 125 is provided at the second enterprise 120 and handles the communication with other enterprises such as the first enterprise 110. The second enterprise communication component 125 includes data storage of a list 126 of authorized recipients 121-124 from within the second enterprise 120. The data storage may also include a list 127 of other enterprises (such as the first enterprise 110) with which the second enterprise 120 communicates.

Each of the first and second enterprises 110, 120 may include senders and recipients and the first and second enterprise communication components 115, 125 may include both lists 116, 126 of authorized senders and recipients from within their enterprise 110, 120. An enterprise may communicate with multiple other enterprises.

Figure 2:
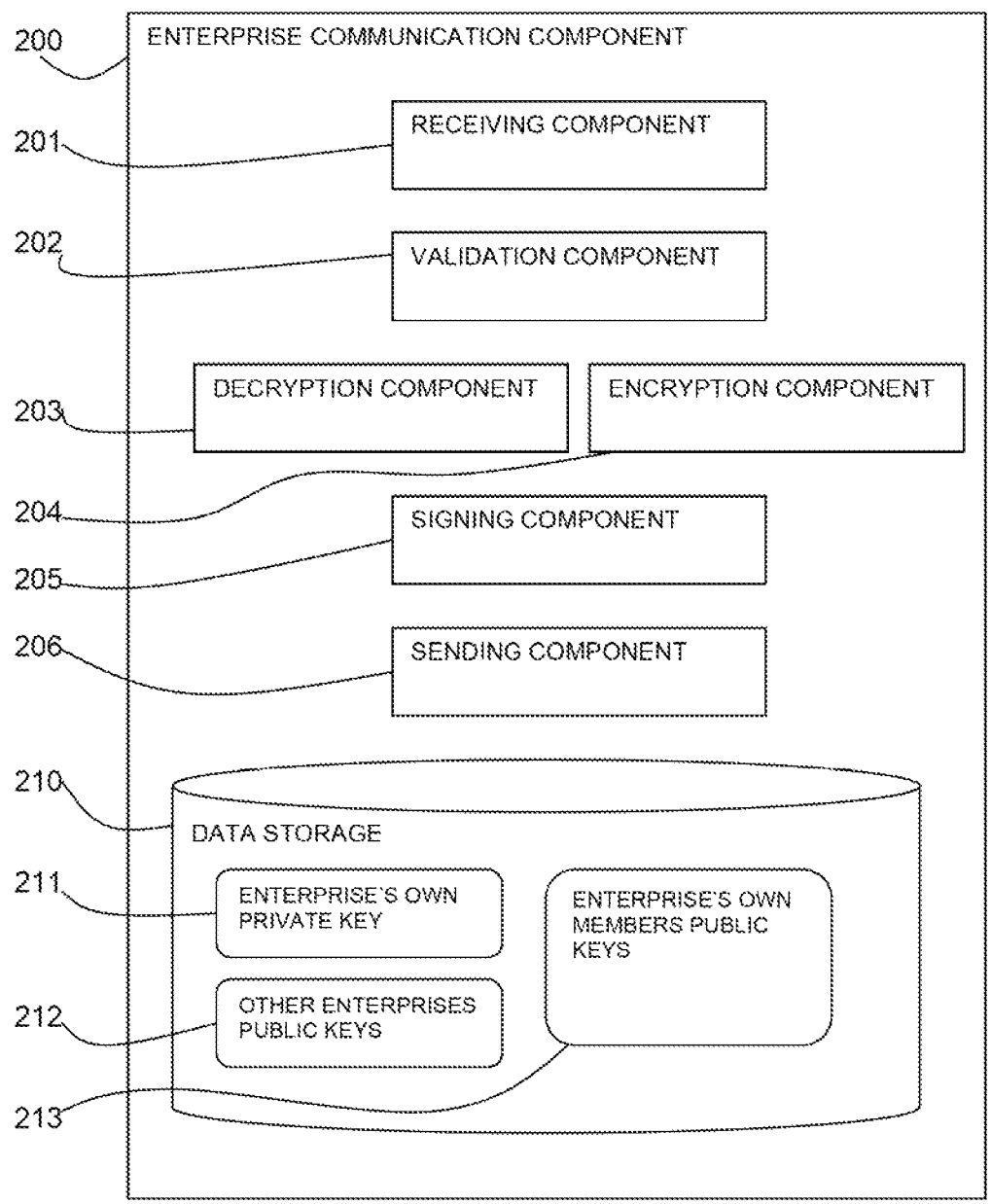
FIG. 2 is a block diagram of component makeup of an example enterprise communication system in accordance with the present disclosure.

Referring to FIG. 2, a block diagram shows an enterprise communication component 200 which may be provided at an enterprise as a device or application to act as an intermediary between the senders and recipients of different enterprises.

The enterprise communication component 200 includes the following components which are common to both a receiving and sending operation of the enterprise communication component 200.

A receiving component 201 is provided for receiving an encrypted and signed message (a previously-encrypted and previously-signed message). The previously-encrypted and signed message may be received from within the enterprise in the case of a message being sent, or from another enterprise in the case of a message being received.

A validation component 202 is provided for checking a digital signature on the received message.

A decryption component 203 and an encryption component 204 are respectively provided for decrypting a message and re-encrypting the message. The decryption and re-encryption may be completed in reverse (re-encryption before decryption) in order to maintain the data in encrypted form and not in plain text.

A signing component 205 is provided for signing the re-encrypted message.

A sending component 206 is provided for sending the signed re-encrypted message. This signed re-encrypted message may be sent to another enterprise in the case of a message being sent, or may be sent to recipients within the enterprise in the case of a message being received.

Two or more of the above components may be combined together, for example, where a combined signing and encryption certificate is used. Also, one or more of the above components can be implemented as program code executing on (a) a data processing device or (b) a data processor of a data processing system, such as presented by FIG. 3, described below.

The enterprise communication component 200 includes or has access to data storage 210 which stores the enterprise's own private key 211, a list 212 of other enterprises' public keys, and a list 213 of the enterprise's own members public keys.

Public-key cryptography is a cryptographic approach which involves the use of asymmetric key algorithms. The asymmetric key algorithms are used to create a mathematically related key pair: a secret private key and a published public key. Use of these keys allows protection of the authenticity of a message by creating a digital signature of a message using the private key, which can be verified using the public key. It also allows protection of the confidentiality and integrity of a message, by public key encryption, encrypting the message using the public key, which can only be decrypted using the private key.

Figure 3:
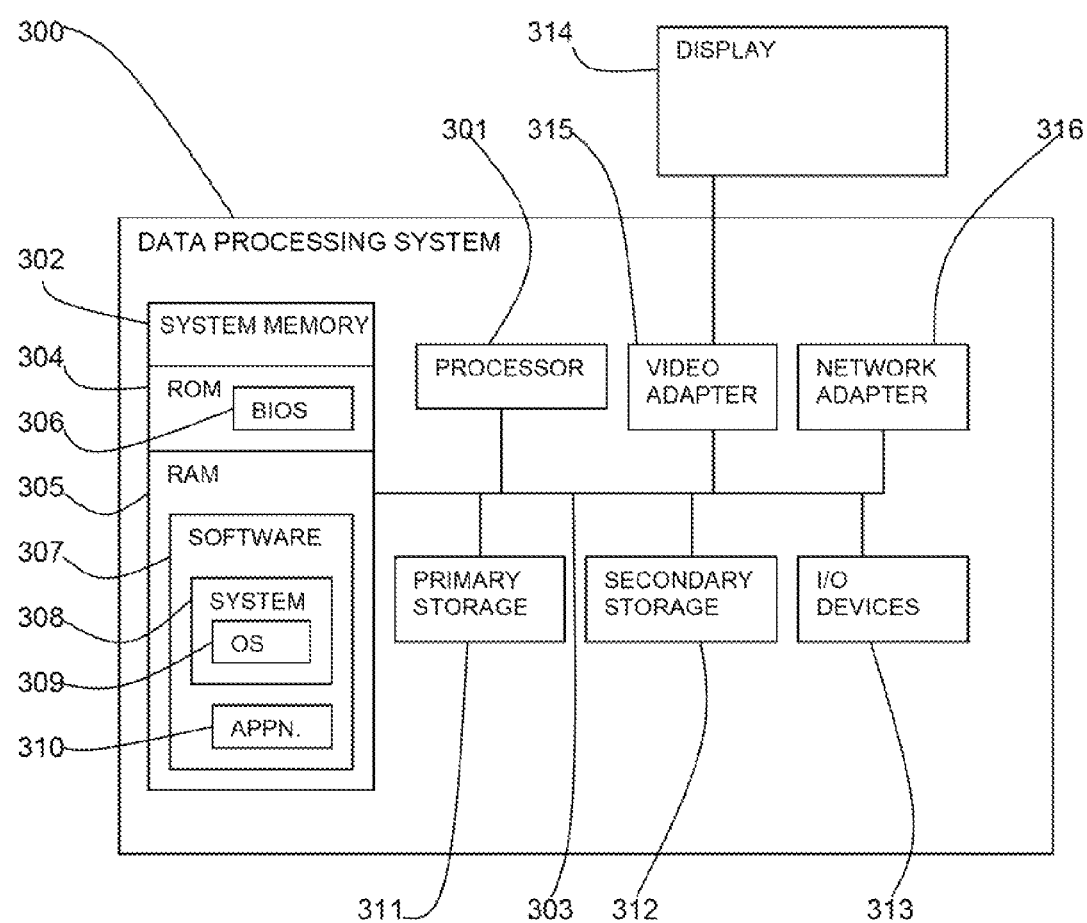
FIG. 3 is a block diagram of a computer system in which the embodiments of the present disclosure may be implemented.

Referring to FIG. 3, an exemplary system for implementing aspects of the disclosure includes a data processing system 300 suitable for storing and/or executing program code, such as the program code of an enterprise communication component or system of FIG. 1 and/or FIG. 2. Data processing system 300 includes at least one processor 301 coupled directly or indirectly to memory elements through a bus system 303. The memory elements can include local memory employed during actual execution of the program code, bulk storage, and/or cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage 311 such as a magnetic hard disk drive and secondary storage 312 such as a magnetic disc drive and an optical disc drive. The drives and their associated computer-readable media provide non-volatile storage of computer-executable instructions, data structures, program modules and other data for the system 300. Software applications may be stored on the primary and secondary storage 311, 312 as well as the system memory 302.

The computing system 300 may operate in a networked environment using logical connections to one or more remote computers via a network adapter 316.

Input/output (I/O) devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4A:
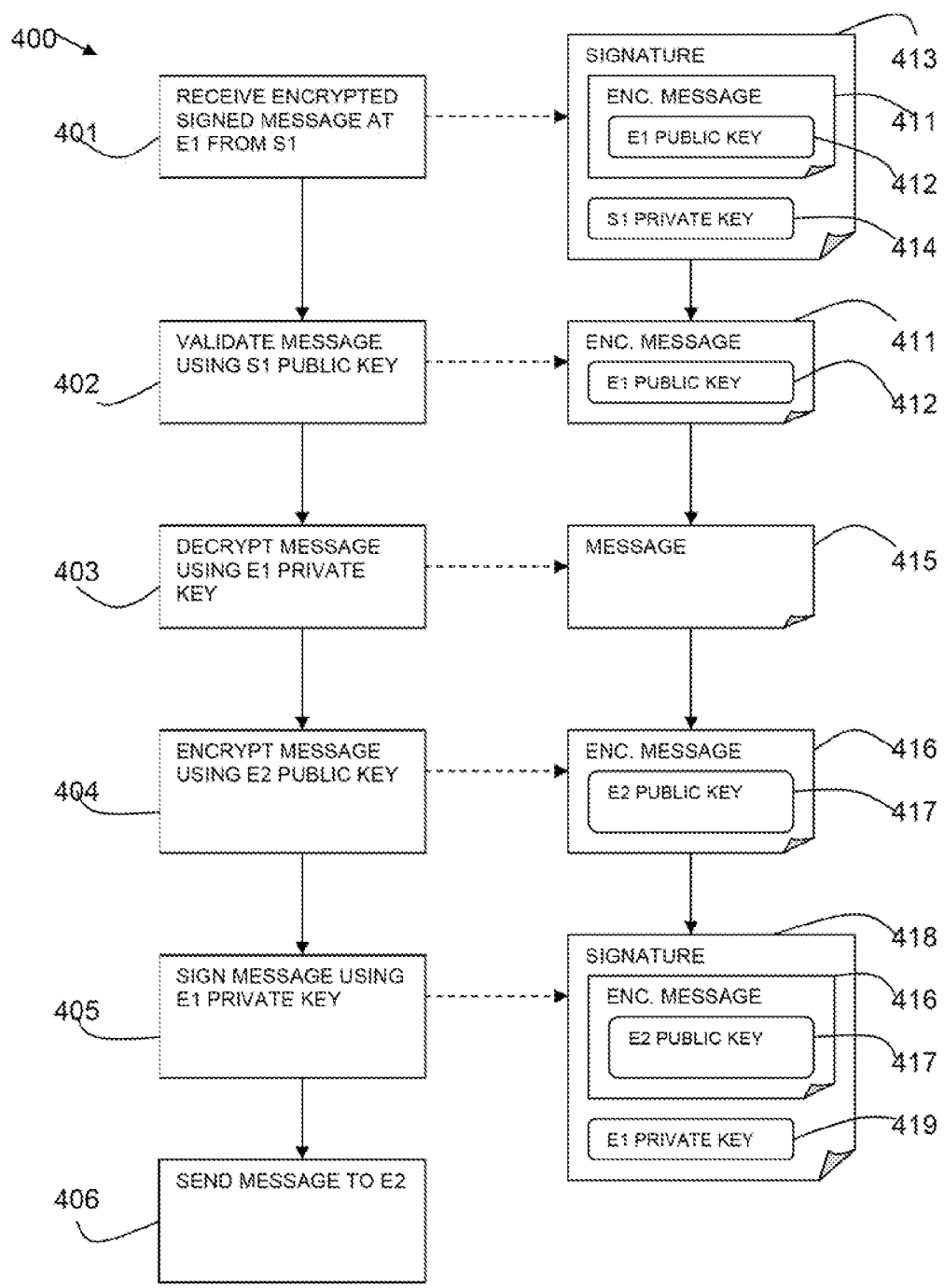
FIG. 4A is a flow diagram of a method of sending a message in accordance with a first embodiment of the present disclosure.

Referring to FIGS. 4A and 4B, schematic flow diagrams 400, 450 show a first embodiment of a method of sending a cross enterprise message and a method of receiving a cross enterprise message respectively.

FIG. 4A shows a flow diagram 400 of a method of sending a cross enterprise message by an enterprise communication component provided at the sending enterprise E1.

The enterprise communication component receives 401 an encrypted signed message at E1 from S1, wherein S1 is a sender from within enterprise E1. The encrypted message 411 is encrypted with the public key of E1 412 and signed 413 with the private key of S1 414.

The component validates 402 the message using its stored S1 public key from its list of authorized senders from within its enterprise. The result is the encrypted message 411 encrypted with the public key of E1 412.

The component decrypts 403 the encrypted message using its own E1 private key to result in a plain text message 415.

The component then encrypts 404 the message using the E2 public key of the enterprise E2 to which the message is to be sent from the stored list of enterprise public keys with which the component may communicate. The result is encrypted message 416 encrypted with E2 public key 417.

The component then signs 405 the message using the private key of enterprise E1. The result is an encrypted message 416 encrypted with the public key of E2 417 and signed 418 with the private key of E1 419.

The encrypted signed message 418 is sent 406 from enterprise E1 to enterprise E2.

FIG. 4B shows a flow diagram 450 of a method of receiving a cross enterprise message by an enterprise communication component provided at the receiving enterprise E2.

The enterprise communication component receives 451 an encrypted signed message at E2 from another enterprise E1. The encrypted message 461 is encrypted with the public key of E2 462 and signed 463 with the private key of E1 464.

The component validates 452 the message using its stored E1 public key from its list of authorized enterprises from which it may receive message. The result is the encrypted message 461 encrypted with the public key of E2 462.

The component decrypts 453 the encrypted message using its own E2 private key to result in a plain text message 465.

The component then encrypts 454 the message individually for the recipients R1-Rm at enterprise E2 using the public keys of R1-Rm. The public keys of R1-Rm are provided on a stored list of authorized recipients within the enterprise E2 at which the component operates. The result is multiple encrypted messages 466A-C each encrypted with one of the R1-Rm public keys 467A.

The component then signs 455 the encrypted messages using the private key of enterprise E2. The result is encrypted messages 466A-C each encrypted with the public keys of R1-Rm 467A and signed 468A-C with the private key of E2 469.

The encrypted signed messages 468A-C are sent 456 from the component at enterprise E2 to its authorized recipients within enterprise E2.

Figure 5B:
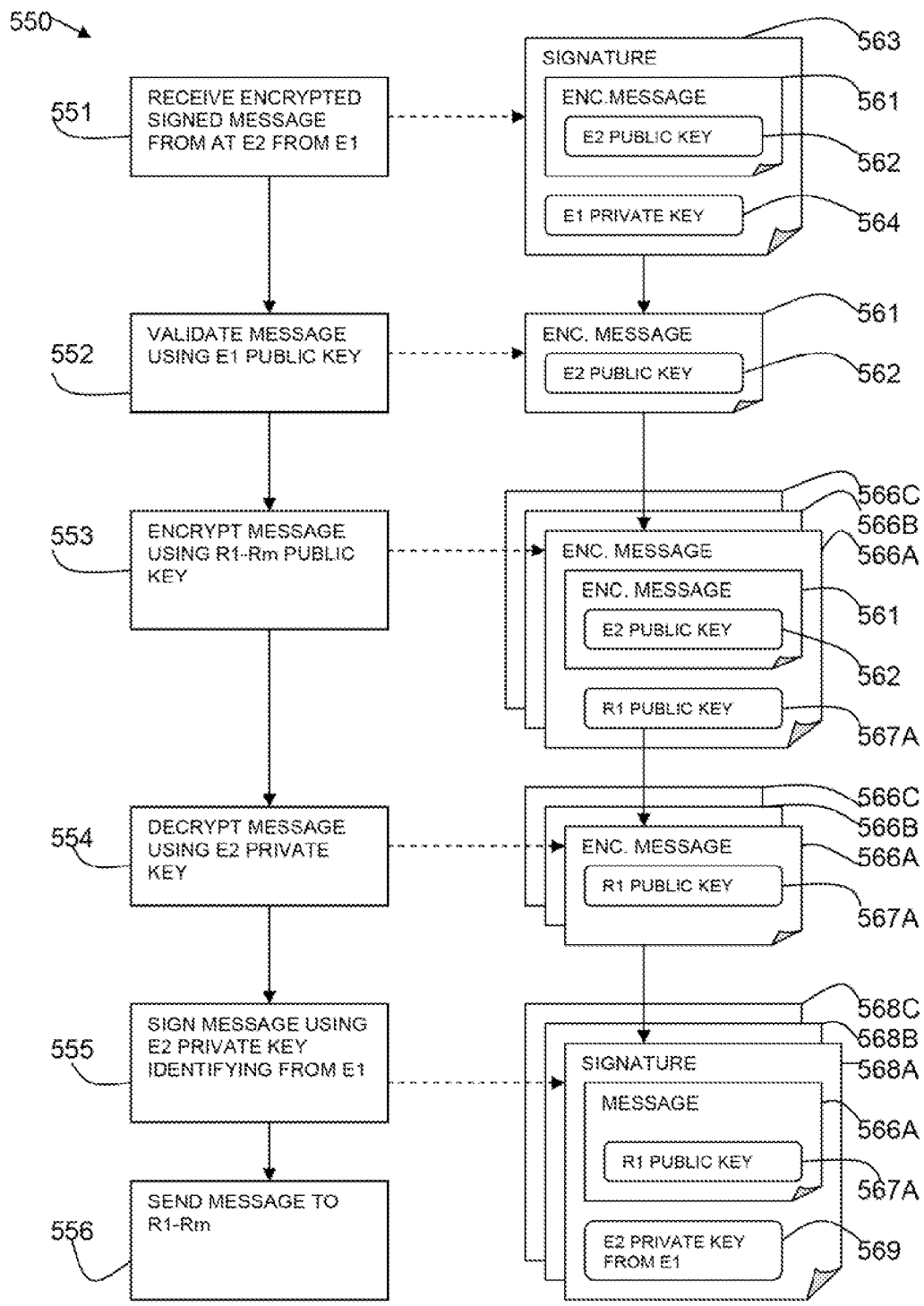
FIG. 5B is a flow diagram of a method of receiving a message in accordance with a second embodiment of the present disclosure.

Referring to FIGS. 5A and 5B, schematic flow diagrams 500, 550 show a second embodiment of a method of sending a cross enterprise message and a method of receiving a cross enterprise message respectively. In the second embodiment, the messages are re-encrypted before decrypting to avoid revealing the plain text message.

FIG. 5A shows a flow diagram 500 of a method of sending a cross enterprise message by an enterprise communication component provided at the sending enterprise E1.

The enterprise communication component receives 501 an encrypted signed message at E1 from S1, wherein S1 is a sender from within enterprise E1. The encrypted message 511 is encrypted with the public key of E1 512 and signed 513 with the private key of S1 514.

The component validates 502 the message using its stored S1 public key from its list of authorized senders from within its enterprise. The result is the encrypted message 511 encrypted with the public key of E1 512.

The component then encrypts 503 the message using the E2 public key of the enterprise E2 to which the message is to be sent from the stored list of enterprise public keys with which the component may communicate. The result is encrypted message 516 encrypted with E2 public key 517 of encrypted message 511 encrypted with E1 public key 512.

The component decrypts 504 the encrypted message 511 using its own E1 private key to result in encrypted message 516 encrypted with E2 public key 517. In this way, the plain text is not revealed.

The component then signs 505 the message using the private key of enterprise E1. The result is an encrypted message 516 encrypted with the public key of E2 517 and signed 518 with the private key of E1 519.

The encrypted signed message is sent 506 from enterprise E1 to enterprise E2.

FIG. 5B shows a flow diagram 550 of a method of receiving a cross enterprise message by an enterprise communication component provided at the receiving enterprise E2.

The enterprise communication component receives 551 an encrypted signed message at E2 from another enterprise E1. The encrypted message 561 is encrypted with the public key of E2 562 and signed 563 with the private key of E1 564.

The component validates 552 the message using its stored E1 public key from its list of authorized enterprises from which it may receive message. The result is the encrypted message 561 encrypted with the public key of E2 562.

The component then encrypts 553 the message individually for the recipients R1-Rm at enterprise E2 using the public keys of R1-Rm. The public keys of R1-Rm are provided on a stored list of authorized recipients within the enterprise E2 at which the component operates. The result is multiple encrypted messages 566A-C each encrypted with one of the R1-Rm public keys 567A of the encrypted message 561 encrypted with E2 public key 562.

The component decrypts 554 the encrypted message 561 using its own E2 private key to result in encrypted messages 566A-C encrypted with one of the R1-Rm public keys 567A. In this way, the plain text is not revealed.

The component then signs 555 the encrypted messages using the private key of enterprise E2. The result are encrypted messages 566A-C each encrypted with the public keys of R1-Rm 567A and signed 568A-C with the private key of E2 569.

The encrypted signed messages 566A-C are sent 556 from the component at enterprise E2 to its authorized recipients within enterprise E2.

The described system logically has two parts which act as a mirror of each other at a sender and recipient enterprise. They may be implemented and exist independently. The functionality may also be combined in a single component.

In the described system, in enterprise E1 there is only one recipient identified per other enterprise. For example, with a distinguished name of E1E2. The message is encrypted and signed just for the communication between enterprise E1 and enterprise E2. As well as simplifying the management of distinguished names, there is less work to be done on the sending component machine, so saving processor resources.

Logically between the two enterprises there is a connection (e.g. a piece of wire or a physical network). At one end of the connection at enterprise E1 is a component in the form, for example, of an application or appliance, which has the private certificate for E1E2. This component does the following:
  validates the data;
  decrypts the key used to encrypt the data;
  re-encrypts the data using the public certificate "E2Enterprise" for the other enterprise;
  signs using the certificate "E1Enterprise"; and
  sends this data.

At the enterprise E2 end of the connection, there is a component which does the following:
  validates that the data is valid by checking the certificate using the public "E1Enterprise";
  decrypts the message using the private key "E2Enterprise";
  maintains a list of potential recipients—this will typically vary with application. Each potential recipient has a public certificate;
  re-encrypts the data for each recipient using the recipient's public key;
  signs with the key called "from_E1" (wholly owned by E2 with the name indicating who it came from);
  sends the data on to its destinations.

Authorized recipients receive the message signed using "from_E1", so the message can be identified as originally coming from enterprise E1.

If a person or new group joins enterprise E1, the list of senders in the component at the sending enterprise E1 end of the wire is updated. This is totally within the enterprise E1's control.

If someone or a group joins enterprise E2 as a new recipient, enterprise E1 does not need to be informed. Only the component at the enterprise E2 end of the connection needs to be updated with the new recipients.

There are two embodiments of the described method and system. In a first embodiment, no information is passed which can identify an original sender S1 at the receiving enterprise E2. All the end receivers R1-Rm at E2 see is the E2E1 information. The received message at R1-Rm identifies the sending enterprise E1 with a name in the certificate. So this could say from 'CUSTOMER1' or it may have the more useful name of from 'IBM' (IBM is a trade mark of International Business Machines Corporation). This naming procedure may be configured by the administrator who defines the certificate.

This first embodiment may provide a reliable and secure mechanism for "blind" communication without the sender needing to know the identity of the recipient, or the recipient the identity of the sender. This embodiment would need to manage communication in both directions (from sender to recipient and back again) but the embodiment would permit the recipient or sender to shield their identity from the "outside world".

In a second embodiment, information on the original sender may be passed all the way through the process to the end receivers R1-Rm. The original data is signed by sender S1. The public certificate for the sender S1 is passed with the data by enterprise E1 and enterprise E2 to the end receivers R1-Rm. This allows the end receivers R1-Rm to see the originator of the data and the chain of signers.

As a further aspect, a first enterprise E1 can try to decrypt a message from a sender S1. If this works, E1 must have the signature of the sender S1 and hence know the sender. If enterprise E1 can validate the signature, it may pass the signature on. If enterprise E1 has a list of authorized senders, it can check to see if the sender S1 is in the list and if the sender S1 is not in the list then the message is not passed on. This aspect may give control over who may send data to other enterprises.

An enterprise communication component for cross enterprise communication may be provided as a service to a customer enterprise over a network.

Aspects of the describe embodiments can take the form of an entirely hardware embodiment or an embodiment containing both hardware and software elements. In one embodiment, aspects of the disclosure are implemented in software, which includes but is not limited to firmware, resident software, microcode, etc. that is executed on or by a processor device or data processing system to perform the various functions described herein.

The disclosure can take the form of a computer program product accessible from a computer-usable or computer-readable medium providing program code for use by or in connection with a computer or any instruction execution system. For the purposes of this description, a computer usable or computer readable medium can be any apparatus that can contain or store the program for use by or in connection with the instruction execution system, apparatus or device, such as a data processing system.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present disclosure.

The invention claimed is:

1. A system for cross enterprise communication, comprising:
  a plurality of enterprises including a first enterprise and a second enterprise;
  a first intermediary hardware communication component at the first enterprise that intermediates communication between the first enterprise and other enterprises of the plurality of enterprises, wherein the first intermediary communication component comprises:
    a receiving component at the first enterprise that receives, from a sender within the first enterprise, a message that is encrypted with a first enterprise public key and signed with a sender private key, wherein the first enterprise public key is associated with the first enterprise, and wherein the sender private key is associated with the sender;

a validation component at the first enterprise that validates the message using a sender public key, wherein the sender public key is associated with the sender;

a decryption component at the first enterprise that decrypts the message using a first enterprise private key, wherein the first enterprise private key is associated with the first enterprise;

an encryption component at the first enterprise that encrypts the message using a second enterprise public key for receipt by a recipient within the second enterprise of the plurality of enterprises, wherein the second enterprise public key is associated with the second enterprise and the second enterprise comprises a second intermediary communication component that includes: a second data storage that contains a list of authorized recipients within the second enterprise and a list of other enterprises the second enterprise communicates with;

a signing component at the first enterprise that signs the message using the first enterprise private key to create a re-signed and re-encrypted message; and a sending component at the first enterprise that sends the re-signed and re-encrypted message to the recipient.

2. The system as claimed in claim 1, further comprising a processing device for executing program code that provides the functionality of one or more of: the first intermediary hardware communication component, the validation component, the decryption component, the encryption component, and the signing component; and wherein the first intermediary hardware communication component uses public key cryptography.

3. The system as claimed in claim 1, wherein the first intermediary hardware communication component includes: a first data storage that contains a list of authorized senders within the first enterprise and a list of second enterprises the first enterprise communicates with.

4. The system of claim 1, wherein the encryption component is configured to encrypt the message using the second enterprise public key before the decryption component decrypts the message using the first enterprise private key in order to prevent a plain text of the message from being revealed.

5. A computer program product comprising computer program code stored on a computer readable device, wherein the program code comprises code portions that when executed on a computer perform the functions of:

receiving, from a sender within a first enterprise of a plurality of enterprises, a message that is encrypted with a first enterprise public key and signed with a sender private key, wherein the first enterprise public key is associated with the first enterprise, and wherein the sender private key is associated with the sender;

in response to receiving the message from the sender within the first enterprise:

validating the message using a sender public key, wherein the sender public key is associated with the sender;

decrypting the message using a first enterprise private key, wherein the first enterprise private key is associated with the first enterprise;

encrypting the message for receipt by a recipient within a second enterprise of the plurality of enterprises using a second enterprise public key, wherein the second enterprise public key is associated with the second enterprise and the second enterprise comprises a second intermediary communication component that includes: a second data storage that contains a list of authorized recipients within the second enterprise and a list of other enterprises the second enterprise communicates with;

signing the encrypted message by the first enterprise using the first enterprise private key to create a re-signed and re-encrypted message; and sending the re-signed and re-encrypted message to the recipient.

6. The computer program product of claim 5, wherein the program code further comprises software code portions that perform the functions of:

maintaining at the first enterprise, a first list of authorized senders of the first enterprise; and maintaining a second list of other enterprises of the plurality of enterprises the first enterprise communicates with.

7. The computer program product of claim 5, wherein the program code is configured to perform the encrypting the message using the second enterprise public key before performing the decrypting the message using the first enterprise private key in order to prevent a plain text of the message from being revealed.

8. The computer program product of claim 5, wherein the program code further comprises software code portions that enable utilization of public key cryptography for validating, decrypting, encrypting, and signing the message.

9. A computer program product comprising computer program code stored on a computer readable device, wherein the program code comprises code portions that when executed on a computer perform the functions of:

receiving, at a second enterprise of a plurality of enterprises, a message from a first enterprise of the plurality of enterprises, wherein the message is signed with a first enterprise private key and is encrypted with a second enterprise public key, wherein the first enterprise private key is associated with the first enterprise, and wherein the second enterprise public key is associated with the second enterprise in response to receiving the message from the first enterprise, the second enterprise:

validating that the first enterprise is the sender using a first enterprise public key, wherein the first enterprise public key is associated with the first enterprise;

decrypting the message using a second enterprise private key, wherein the second enterprise private key is associated with the second enterprise and the second enterprise comprises a second intermediary communication component that includes: a second data storage that contains a list of authorized recipients within the second enterprise and a list of other enterprises the second enterprise communicates with;

encrypting the message for receipt by one or more recipients at the second enterprise using one or more public keys associated with the one or more recipients to create one or more encrypted messages;

signing the one or more encrypted messages using the second enterprise private key, wherein signing the one or more encrypted messages further comprises indicating within the one or more encrypted messages that the one or more encrypted messages are from the first enterprise; and sending the one or more encrypted message to the one or more recipients;

wherein the program code further comprises code that enables utilization of public key cryptography for validating, decrypting, encrypting, and signing the message.

10. The computer program product of claim 9, wherein the program code further comprises software code portions that perform the functions of:

maintaining, at the second enterprise, a first list of authorized recipients within the second enterprise; and maintaining a second list of other enterprises of the plurality of enterprises that the second enterprise communicates with.

11. The computer program product of claim 9, wherein the program code is configured to perform the encrypting the message for receipt by one or more recipients at the second enterprise before performing the decrypting the message using a second enterprise private key in order to prevent a plain text of the message from being revealed.

* * * * *